United States Patent Office.

WILLIAM K. WYCKOFF, OF RIPON, WISCONSIN.

Letters Patent No. 92,924, dated July 20, 1869.

IMPROVED COMPOUND OIL FOR COATING LEATHER AND METALS.

The Schedule referred to in these Letters Patent and making part of the same.

*To whom it may concern:*

Be it known that I, WILLIAM K. WYCKOFF, of Ripon, in the county of Fond du Lac, in the State of Wisconsin, have invented new and specific improvements upon my original method for preparing a "composition of matter," and for which Letters Patent, No. 58,532, were granted to me, October 2, 1866; and I do hereby declare that the following is a full and exact description thereof.

The nature of my invention consists in providing an improved water-proof oil, for the preservation of leather and metals, popularly known as "Naiad Water-Proof Oil;" and The improvements comprise important modifications in proportions of materials used, and in the rejection of one article altogether, as described and provided in Letters Patent, No. 58,532, issued to me, October 2, 1866; but the most important improvement consists in the addition of an unmixed paraffine oil, not used heretofore in the original composition.

To enable others skilled in the art to make and use my invention, I will describe the process or method and the materials made use of in its manufacture.

I procure a good article of petroleum residuum, (called, also, tar,) having it free from sediment or coke, and putting it into a suitable boiler, set in an arch. There are added to each and every forty (40) gallons of it, ten (10) gallons or crude paraffine-oil; and for each fifty (50) gallons of the residuum and paraffine-oil, so mixed, twenty-five (25) pounds of common salt (chloride of sodium) should be thrown in the kettle.

The use of the solution of salt, as mentioned in the original specification, is now rejected as unnecessary.

If a wood or coal fire is used, it should always be in a suitable fire-pan, that may be readily withdrawn from under the kettle whenever the temperature gets too high; and care should be exercised never to get a scorching heat upon the oils, as they may be spoiled, but an even temperature, about as in boiling linseed-oil, should be maintained, frequently stirring or agitating in any convenient way.

If steam is used, a pipe leading down into and near the bottom of the boiler or tank, will be all that is required for heating and agitating.

While the salt is in the boiler, the heat should be kept up from three (3) to five (5) hours, it depending upon a steady, even temperature being kept, and thoroughness of agitation. This is the refining and deodoring-process.

As soon as the salt and sediment have well settled, after sufficient boiling, as above, the oil should be removed from the kettle, straining it into some convenient receptacle, and the kettle cleaned, after which the oils should be returned, adding, for each fifty (50) gallons, twelve and one-half (12½) pounds of good, strained rosin, and dissolved with a moderate heat; then add twelve (12) (about three-quarter-pound) bars of common yellow rosin or palm-soap, cut up into small cakes, and keep up only heat enough to dissolve the soap. Before this composition has become thoroughly cool, add twelve and one-half (12½) pounds of good ivory or drop-black, previously well ground through a paint-mill, in some of the oil from the kettle, and stir so as to have the whole well incorporated. This completes the compounding-process, occupying two (2) or three (3) hours' time, and in removing from the kettle, it will be better to strain the mixture.

Several years' continued experience in manufacturing my water-proof oil for leather, and a practical knowledge of its effects, lead me to adopt such improvements as are herein specified, to wit:

To reduce the proportions of nearly all the ingredients used in the original patent; to reject entirely the carburet of iron or graphite; and to increase the quantity as well as to improve the quality of the oils employed, by adding one-fourth part of pure paraffine-oil.

In the original refining-process, one pound of salt to the gallon of oil was used; one-half pound to the gallon is found sufficient. And in the compounding-process, one pound of rosin to the gallon was used; now one fourth of a pound is deemed better; and instead of a whole bar of soap to the gallon, a half bar is now used; and the quantity of color is reduced nearly or quite one-half, according to its quality.

By such reduction of the several component parts, as described, the slight additional cost of using more oil is fully equalized, and the gross expenses of manufacturing the water-proof composition are decreased rather than increased.

My improved water-proof oil, as herein presented, possesses, to an eminent degree, the many important advantages claimed for it, as follows:

First, it never becomes rancid, changes of climate will not affect it, and it cannot freeze.

Second, it will not gum or fry out, but is penetrating, and will make and keep leather soft and pliable.

Third, it strengthens the fibres of leather, and prevents them from breaking or cracking.

Fourth, it resists the destructive effects of salt water upon leather.

Fifth, rats, mice, or other vermin will not touch or destroy leather dressed with it.

Sixth, it takes at least one-half less for the same surface than other oils, and the effects produced are much more lasting.

Seventh, it contains no acids, naphtha, coal-oil, spirits of turpentine, rubber, or other injurious substances.

Eighth, it will prevent rust on metals, and remove it where rusting has commenced.

Ninth, it is an oil-blacking.

Tenth, it is absolutely water-proof.

What I claim, is—

The improved water-proof oil-preservative for leather and metals, with the ingredients combined in about the proportions herein named, and with the addition of the specific oil mentioned, and not heretofore used, the whole prepared substantially as set forth.

WILLIAM K. WYCKOFF.

Witnesses:
  H. B. BAKER,
  W. T. RUNALS.